United States Patent [19]

Cline

[11] Patent Number: 4,653,214
[45] Date of Patent: Mar. 31, 1987

[54] ONE MAN SEINE

[76] Inventor: David D. Cline, 1709 West St., Rosenberg, Tex. 77471

[21] Appl. No.: 900,299

[22] Filed: Aug. 25, 1986

[51] Int. Cl.⁴ ............................................. A01K 73/12
[52] U.S. Cl. ............................................. 43/14; 43/11
[58] Field of Search ........................... 43/14, 7, 11

[56] References Cited

U.S. PATENT DOCUMENTS

| | | | |
|---|---|---|---|
| 559,802 | 5/1896 | Hunt | 43/11 |
| 2,783,573 | 3/1957 | Rau | 43/11 |
| 2,921,397 | 1/1960 | Luthi | 43/11 |
| 2,939,238 | 6/1960 | Ertel | 43/11 |
| 3,548,531 | 12/1970 | Holden | 43/11 |
| 3,699,700 | 10/1972 | Kinsell | 43/14 |
| 3,747,250 | 7/1973 | Willinger | 43/11 |
| 4,619,065 | 10/1986 | Jones | 43/11 |

Primary Examiner—Gene P. Crosby
Attorney, Agent, or Firm—Guy E. Matthews

[57] ABSTRACT

A purse type seine readily operable by one person. Includes a woven purse seine, a rectangular support frame connected to the perimeter of the intake opening, and an elongated operating handle connected to the upper side of the frame at a selected angle permitting the person to manually operate the seine when walking behind the seine where the frame and purse opening remains ahead of the person with the bottom edge of the said frame extending slightly further ahead than the top edge of said frame. A flotation device is attached to the seine near the full depth of the purse and disposed to be on the top of the seine when the person is pushing the frame through water.

20 Claims, 11 Drawing Figures

ONE MAN SEINE

FIELD OF THE INVENTION

This invention generally relates to fishing seines and nets and more particularly pertains to a purse type seine which may be readily manipulated and operated by one person.

BACKGROUND OF THE INVENTION

Present seining operations are extensive in wadeable shallow water to catch fish bait, crustacea, and the smaller types of fish. The seines presently in use are manually handled by two persons gripping a long handle at either end of the seine. Such seines normally form a type of purse or pocket to catch whatever aquatic wildlife the persons are seining for. Small purse seines, generally in a hoop shape of 12 to 18 inches diameter, for example, are attached to a handle extending from the same plane as the hoop and used by a single person. The small purse seines are generally used for functions such as to catch bait, crabs, and the like out of tanks at points of sale to customers. Another purse type seine having a handle and in common use is the "net" used by fishermen in landing fish caught by hook and line.

There appears to be a definite need for a purse seine such as herein described where the person using the seine may stand behind the seine and push it through the water to catch whatever that person is fishing for.

Other than the seines and nets mentioned above, no more specific prior art is presently known.

OBJECTS OF THE INVENTION

One object of the present invention is to provide a purse seine which may have as large an opening and as deep a purse as one person is capable of handling manually in situations where that person may guide the seine through areas desired and retrieve the catch from the seine without assistance.

Another object of the present invention is to provide a purse seine supported at its opening by a frame having some degree of buoyancy so that the operator may push a seine of relatively large size without undue exertion.

Another object of the present invention is to provide a one man seine which may be dismembered into discrete elements for transportation and storage, by automobile for example, and readily reassembled at the fishing site.

SUMMARY OF THE INVENTION

The forgoing and other objects of the invention are attained by a purse type seine readily operable by a single person to catch fish, crustacea, and the like, including a woven purse seine of selected mesh size, depth of pocket, and intake opening, a generally rectangular support frame generally of greater width than height connected to the entire perimeter of the intake opening to maintain the intake opening to be the size of the frame, and an elongated operating handle connected to the upper side of the frame at a selected angle permitting one person to manually operate the seine when walking behind the seine where the frame and pocket opening remains ahead of the operator with the bottom edge of the frame extending slightly further ahead than the top edge of the frame. Flotation devices are attached to the seine near the full depth of the purse and disposed to be on the top of the seine when the person is pushing the frame through water. The seine may be attached to the frame by means of lacing line. The seine alternately may be attached to the frame by means of a "VELCRO" bristle and looped fabric connection arrangement with one part of the connection being attached around the intake opening of the seine and the other part of the connection being attached to a sheet of material which encloses the frame. A releasable connector may detachably connect the operating handle to the frame. The top and the bottom of the frame are substantially straight. The sides of the frame may be formed with a slight curve to project the bottom edge of the frame slightly forward of the top edge of the frame when the frame is being moved along in fishing position. The connector may include spring loaded studs confined in the operating handle and adapted to spring out into latching position within accommodating holes in the frame member. The connector may include a latchable adjustable pivot to adjust the relative angle between the operating handle and the frame. The connector may include a sleeve formed to fit over end members of the frame and be riveted thereto. The frame may be unitary and formed of a single member with the ends attached into a portion of the connector. The frame may be formed of hollow tubing to provide buoyancy to the frame in addition to structural strength. The connector may include a plurality of threaded screws and wing nuts to removeably fasten the handle to the frame.

DESCRIPTION OF A PREFERRED EMBODIMENT

Figure 1:
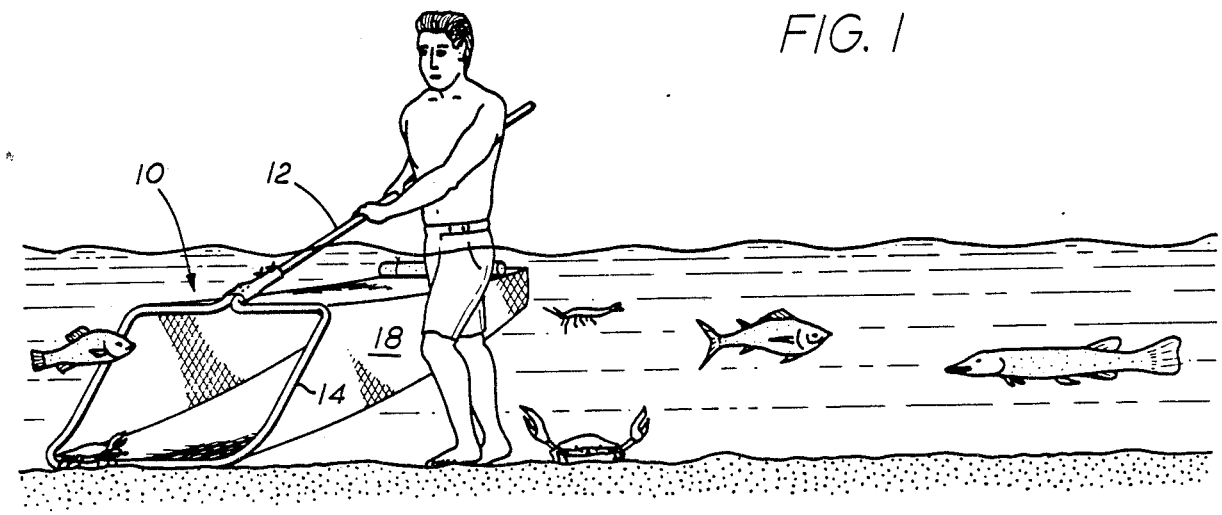
FIG. 1 is a pictorial view of a person operating the seine of the present invention through shallow water.

Referring to FIG. 1, a person is shown operating a purse seine 10 through manipulation of its operating handle 12. As shown, the purse seine 10 is being pushed along on or near the bottom under the water body. A variety of aquatic wildlife is shown in FIG. 1 to illustrate different kinds which may be caught through use of purse seine 10.

Figure 2:
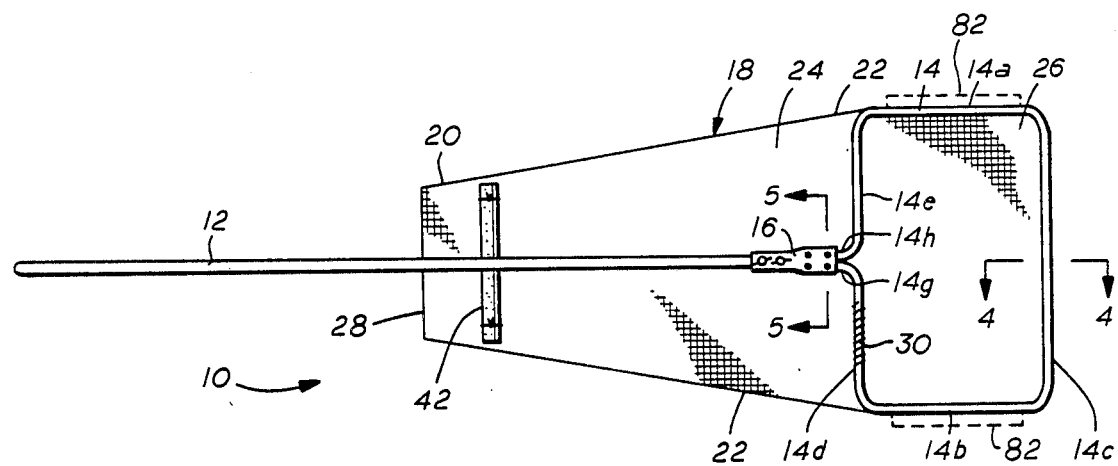
FIG. 2 is a plan view of the purse seine shown in FIG. 1.
Figure 5:
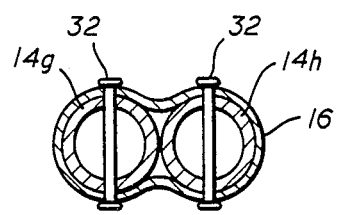
FIG. 5 is a sectional view taken along the line 5—5 of FIG. 2 and showing attachment of the seine frame to a handle connector element.
Figure 6:
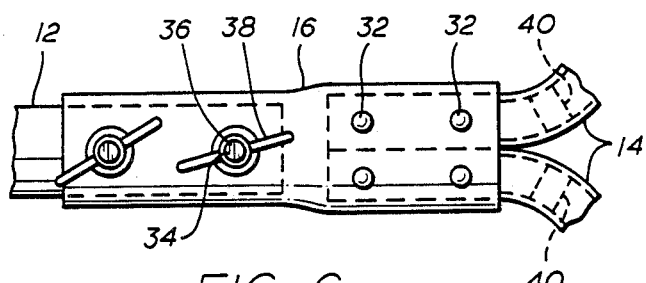
FIG. 6 is a detailed view of the handle connector element illustrated in FIGS. 2 and 5.

In FIG. 2 the purse seine 10 is seen to include a forward seine frame 14 which is formed of a single elongated structural member, generally shaped into the rectangular shape shown with each end of the member further shaped to provide parallel ends 14g and 14h which fit into a handle bracket 16 as shown in FIGS. 5 and 6.

A convenient material initially utilized to form the operating handle 12 and the seine frame 14 has been galvanized electrical conduit available in standard lengths of ten feet. Accordingly, the size of the opening through the seine frame 14 was established with ten feet being the total length of the two sides 14a and 14b the frame, the bottom 14c of the frame, the top of the frame 14d and 14e, and the two parallel end pieces 14g and 14h extending into the handle bracket 16.

Figure 3:
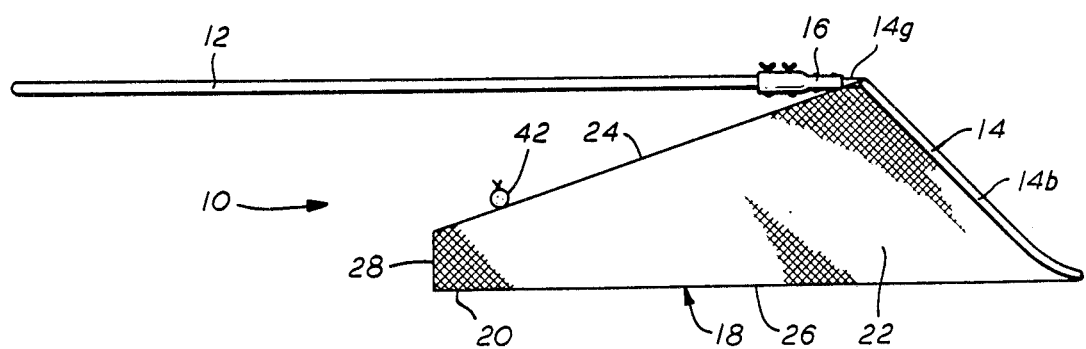
FIG. 3 is a side elevational view of the purse seine shown in FIG. 1.

As shown in FIGS. 2 and 3, the frame 14 has been formed to provide a selected angle between the frame 14 and the handle bracket 16 from which operating handle 12 extends. The exemplary angle shown in FIG. 3 is about 135° between the axis of the handle 12 and the plane of the seine frame 14.

A net 18, as shown, is formed as a generally converging rectangular tube adapted to be fitted around and attached to the frame 14 at its front end and converging to a small pocket 20 at its rear end. As shown, the net 18 maybe of stitched construction having side panels 22, a top panel 24, a bottom panel 26, and an end piece 28. Such stitched construction is satisfactory for small quantities of the net 18. However, for large quantities it is recommended that the net 18 be fabricated in the shape generally as shown, but as a unitary article. The net 18 may be attached to the seine frame 14 by means of a lacing cord or line 30 shown partially at the top of the frame 14 in FIG. 2, or by the fastening arrangement shown and later described with reference to FIG. 4.

The handle bracket or connector 16, shown in FIGS. 5 and 6, is shown to be formed at one end to receive the ends 14h and 14g of the frame 14 in fitted relation and firmly attached by fasteners such as rivets 32 to become an integral part of the frame 14. The other end of the bracket 16 is formed to receive an end of operating handle 12 in fitted relationship with the handle 12 being releaseably fastened into the bracket 16 by means of threaded fasteners 34 including threaded screws 36 and wing nuts 38.

Of important note is that the ends of the conduit forming the frame 14 are provided with seal plugs 40, formed of epoxy plastic, rubber plugs, or similar plugging elements. These plugs 40 serve to exclude water from entering the hollow chamber formed within frame 14 which provides a measure of buoyancy to frame 14 proportionate to the volume of the enclosed chamber. While such buoyancy may not be sufficient for the frame 14 to float on water, it is of great benefit in reducing the effective weight of the seine 10 as carried by the operator when the seine 10 is submerged into operating position.

Near the pocket 20 is attached one or more sections of a flotation device 42 which serves generally to lift the pocket 20 while seine 10 is being operated in submerged fashion and also to hold the pocket 20 open and thus facilitate a clear opening through the net 18 to pocket 20 to contain the aquatic wildlife caught during the seining operation. The flotation device is attached to the upper portion or panel 24 of the net 18 by means of lacing, cords, or the like.

Figure 4:
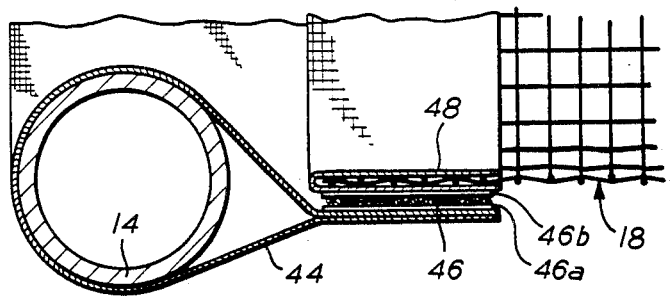
FIG. 4 is a detailed view taken along the line 4—4 of FIG. 2 and showing one preferred means of attaching the purse seine to the seine frame.

Another arrangement for releasably attaching the net 18 to the frame 14 is illustrated in FIG. 4. A strip of strong and wear resistant fabric 44, for example a canvas like material made of polyester, nylon, or cotton ducking, is disposed around frame 14 as shown, then stitched together along with either the bristled hook portion 46A or the looped fabric portion 46B of a "Velcro" (R) type fastener 46 as now commonly used as a detachable fastener for all kinds of fabric.

The other member of Velcro fastener 46 is stitched around the periphery of the forward opening of the net 18 which net has been backed by an appropriate folded over facing 48 for purposes of reinforcement and good appearance.

With some seine operators, it may become desirable to have the angle between the frame 14 and the operating handle 12 increased or reduced at the ready convenience of the person, and depending on the depth of the water, the height of the person, and the person's personal opinion as to what angle might be best for that person's use.

Figure 9:
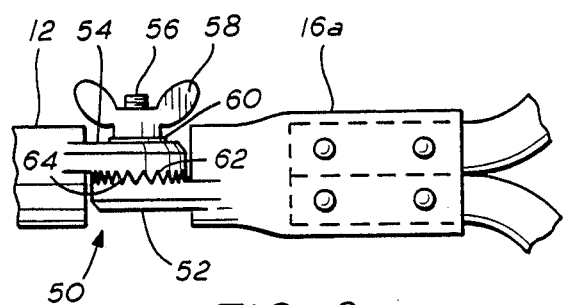
FIG. 9 is a detailed view showing an alternate embodiment of the connector element of FIG. 6 which inditionally includes an angular adjustment and locking structure.

FIG. 9 shows a modification of the bracket 16, identified as 16A, in which is provided an angular adjustment and locking mechanism 50. Mechanism 50 includes two toothed adjustment plates 52 and 54 which are relatively pivotable around a threaded stud 56. A threaded wing nut 58 and washer 60 complete the assembly as shown, which permits the angularity of the plates 52 and 54 to be freely adjustable when the wing nut is in position permitting disengagement of the teeth 62 and 64. When a desired angle has been found, the teeth 62 and 64 are engaged, and locked into position by means of the wing nut 58 and washer 60.

Figure 8:
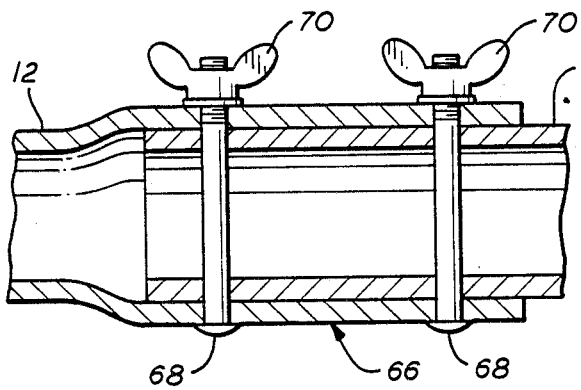
FIG. 8 is a detailed cross section showing a releasable connector suitable for use to divide the elongated operating handle shown in FIGS. 1-3 into two parts for stowage.
Figure 10:
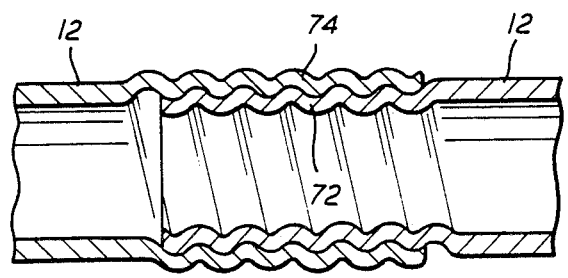
FIG. 10 is a detailed sectional view of a threaded connector arrangement for releaseably connecting two parts of the elongated handle as previously described for FIG. 8.
Figure 11:
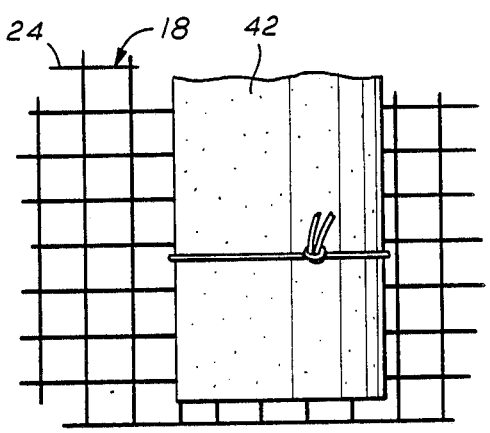
FIG. 11 is a detailed view of part of a flotation device shown in FIGS. 1-3 as being attached near the end of the purse seine.

FIGS. 8 and 10 show optional releasable connections suitable for providing the operating handle 12 as two connectable parts (not shown) should the reduced length become desirable or necessary in spaces where the purse seine 10 is stored or transported.

FIG. 8 shows a conventional tube and socket arrangement 66 which is connected together by threaded fasteners 68 including wing nuts 70. FIG. 10 shows a threaded releasable connection including a male rolled thread 72 on one member and a female rolled thread 74 on the other member.

Figure 7:
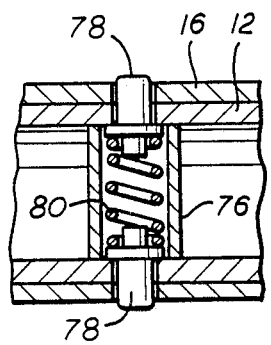
FIG. 7 is a partially cross sectional view showing a spring loaded latch arrangement suitable for use with the connector element of FIG. 6 and as an alternate to the connector arrangements shown in FIGS. 8 and 10.

In FIG. 7 a spring loaded plunger fastening mechanism 76 is shown. As shown the fastener 76 includes plungers 78 urged apart by spring 80 with the plungers confined in holes of one member and adapted to be snapped in and out of corresponding holes in another member. This fastener 76 maybe optionally provided in lieu of the threaded fasteners for the handle bracket 16 as shown in FIG. 6 or the threaded fasteners for the connector 66 as shown in FIG. 8.

Since variations of the purse seine 10 may be made by use of the different embodiments shown in FIGS. 4–10, and possibly others occurring to a manufacturer, the criteria by which these embodiments are employed will be what the customers want as compared to manufacturing costs for a particular version employing a particular set of embodiments.

As a preferred embodiment, purse seine 10 can be fabricated as the embodiment shown in FIGS. 1–6 and 11, for example. Such construction permits the seine 10 to be disassembled into a net section, a frame section, and a handle section to be stowed in the trunk of an automobile, for example.

At the fishing site, the seine 10 is assembled as shown in FIGS. 1–3 for use by the operator. The seine is positioned with the frame 14 ahead of the operator and with the frame 14 near or on the bottom of the water body where a catch is anticipated. The person pushes and guides the seine 10 along and walks alongside of the net 18 with the forward speed of the seine 10 being sufficient to balloon the net into the purse shape as shown. The flotation device 42 holds the pocket 20 of the seine 18 up off the bottom and keeps the pocket 20 open to receive any catch brought through the frame 14. The affective weight of frame 14 while submerged in the water is affectively reduced by the sealed chamber within the frame 14 and thereby decreases the effort required to manipulate seine 10 under water.

As previously mentioned, the frame 14 was built of a single ten foot piece of conduit which limits the actual size of the opening through the frame 14. In practice the frame 14 may be fabricated as large as desired depending on the size and strength of the operator and the desired size of the net 18. In the preferred embodiment described, the frame 18 defines an opening of about 32 inches in width and 28 inches in height for the opening. The net is of size such that the top panel 24 is about 42 inches in length, the bottom panel 26 is about 60 inches in length and the height of the end piece 28 is about 4 inches. The frame 14 is made of ¾ inch electrical conduit and the operating handle 12 is made of an 1-¼ inch electrical conduit.

When frame 14 becomes larger and heavier, more buoyancy for the frame 14 may be desired. In such case, auxiliary flotation devices 82 maybe provided on the sides 14A and 14B of frame 14 as indicated in dashed lines in FIG. 2. Flotation devices 12 and 82 may be provided of foamed plastic such as styrene or polyurethane, for example, to provide very good buoyancy as needed with minimum size of the flotation devices.

While only one preferred embodiment with suitable variations has been illustrated and described, it is to be understood that further changes and revisions may be made within the spirit of the invention as come within the purview and scope of the appended claims.

What is claimed is:

1. In a purse type seine readily operable by only one person to catch fish, crustacea, and the like, the combination comprising:
   (a) a woven purse seine of selected mesh size, depth of purse and intake opening;
   (b) a generally rectangular support frame formed generally of greater width than height connected to the entire perimeter of said intake opening to maintain said intake opening to be the size of said frame;
   (c) an elongated operating handle connected to the upper side of said frame at a selected angle permitting said person to manually operate the seine while walking adjacent to the seine where said frame and said opening remains ahead of said person with the bottom edge of said frame extending along or near the bottom of a body of water; and
   (d) flotation means attached to said seine near the full depth of said pocket and disposed to be on the top of said seine when the operator is pushing said frame through water.

2. The combination of claim 1 wherein said seine is connected to said frame by means of lacing line.

3. The combination of claim 1 wherein said seine is releasably connected to said frame by means of a "VELCRO" (TM) bristle and fabric connection means with one part of said connection being attached around the intake opening of said seine and the other part of said connection means being attached to a sheet of material which encloses said frame.

4. The combination of claim 1 further including a releasable connector means for detachably connecting said operating handle to said frame.

5. The combination of claim 1 wherein the top and the bottom of said frame are substantially straight with the sides of said frame being formed with a slight curve to project the bottom edge of the frame slightly forward of the top edge of the frame when the frame is being moved along in fishing position.

6. The combination of claim 4 wherein said frame is unitary and formed of a single member with the ends attached into a portion of said releasable connector means.

7. The combination of claim 4 wherein said releasable connector means includes a sleeve formed to fit over the end members of said frame and be fastened thereto.

8. The combination of claim 1 wherein said frame is formed of sealed hollow tubing to provide buoyancy to said frame in addition to structural strength.

9. The combination of claim 4 wherein said releasable connector means includes an adjustable pivot to adjust the relative angle between said operating handle and said frame.

10. The combination of claim 4 wherein the releasable connector means includes a plurality of threaded screws and wing nuts to removably fasten said handle to said frame.

11. The combination of claim 4 wherein said releasable connector means includes spring loaded studs confined in said operating handle and adapted to spring out into latching position within accommodating holes in said frame member.

12. In a purse type seine readily operable by only one person to catch fish, crustacea, and the like, the combination comprising:
   (a) a woven purse seine of selected mesh size, depth of purse and intake opening;
   (b) a generally rectangular support frame formed generally of greater width than height connected to the entire perimeter of said intake opening to maintain said intake opening to be the size of said frame;
   (c) an elongated operating handle connected to the upper side of said frame at a selected angle permitting said person to manually operate the seine while walking adjacent to the seine where said frame and said opening remains ahead of said person with the bottom edge of said frame extending along or near the bottom of a body of water; and
   (d) flotation means attached to said seine near the full depth of said pocket and disposed to be on the top of said seine when the operator is pushing said frame through water; and
   (e) a releasable connector means for detachably connecting said operating handle to said frame.

13. The combination of claim 12 wherein said seine is releasably connected to said frame by means of a "VELCRO" (TM) bristle and fabric connection means with one part of said connection being attached around the intake opening of said seine and the other part of said connection means being attached to a sheet of material which encloses said frame.

14. The combination of claim 12 wherein said seine is connected to said frame by means of lacing line.

15. The combination of claim 12 wherein the top and the bottom of said frame are substantially straight with the sides of said frame being formed with a slight curve to project the bottom edge of said frame slightly forward of the top edge of said frame when said frame is being moved along in fishing position.

16. The combination of claim 12 wherein said releasable connector means includes an adjustable pivot to adjust the relative angle between said operating handle and said frame.

17. The combination of claim 12 wherein said frame is unitary and formed of a single member with the ends attached into a portion of said releasable connector means.

18. The combination of claim 17 wherein said frame is formed of sealed hollow tubing to provide buoyancy to said frame in addition to structural strength.

19. The combination of claim 1 further including flotation means connected to the sides of said frame.

20. The combination of claim 12 further including flotation means connected to the sides of said frame.

* * * * *